United States Patent
Smolic et al.

(10) Patent No.: US 9,571,812 B2
(45) Date of Patent: Feb. 14, 2017

(54) SIGNALING WARP MAPS USING A HIGH EFFICIENCY VIDEO CODING (HEVC) EXTENSION FOR 3D VIDEO CODING

(71) Applicant: Disney Enterprises, Inc., Burbank, CA (US)

(72) Inventors: Aljoša Smolic, Aargau (CH); Nikolce Stefanoski, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 373 days.

(21) Appl. No.: 14/141,088

(22) Filed: Dec. 26, 2013

(65) Prior Publication Data

US 2014/0307048 A1    Oct. 16, 2014

Related U.S. Application Data

(60) Provisional application No. 61/811,473, filed on Apr. 12, 2013.

(51) Int. Cl.
*H04N 13/00* (2006.01)
*H04N 19/597* (2014.01)
(Continued)

(52) U.S. Cl.
CPC ......... *H04N 13/0048* (2013.01); *G06T 3/0093* (2013.01); *H04N 13/0066* (2013.01);
(Continued)

(58) Field of Classification Search
CPC .. H04N 13/0048; H04N 19/54; H04N 19/597; H04N 19/70; H04N 13/0066; H04N 13/026; H04N 13/0271; H04N 13/0059; H04N 13/0275; G06T 3/0093
See application file for complete search history.

(56) References Cited

U.S. PATENT DOCUMENTS 6,031,538 A    2/2000  Chupeau et al.
6,956,566 B2  10/2005  Gelb
(Continued)

FOREIGN PATENT DOCUMENTS

WO    2008139351 A1    11/2008

OTHER PUBLICATIONS

Sefanoski et al., "3DV: Results on Coding of Warps using HEVC," Joint Collaborative Team on 3D Video Coding Extension Development of ITU-T SG 16 WP 3 and ISO/IEC JTC 1/SC 29/WG 11, Stockholm, SE, Jul. 16-20, 2012.*
(Continued)

*Primary Examiner* — Thai Tran
*Assistant Examiner* — Christopher T Braniff
(74) *Attorney, Agent, or Firm* — Patterson + Sheridan LLP

(57) ABSTRACT

Techniques are disclosed for view generation based on a video coding scheme. A bitstream is received that is encoded based on the video coding scheme. The bitstream includes video, quantized warp map offsets, and a message of a message type specified by the video coding scheme. Depth samples decoded from the first bitstream are interpreted as quantized warp map offsets, based on a first syntax element contained in the message. Warp maps are generated based on the quantized warp map offsets and a second syntax element contained in the message. Views are generated using image-domain warping and based on the video and the warp maps.

20 Claims, 7 Drawing Sheets

(51) Int. Cl.
H04N 19/70 (2014.01)
H04N 13/02 (2006.01)
G06T 3/00 (2006.01)
H04N 19/54 (2014.01)

(52) U.S. Cl.
CPC ....... H04N 13/026 (2013.01); H04N 13/0271 (2013.01); H04N 19/54 (2014.11); H04N 19/597 (2014.11); H04N 19/70 (2014.11); H04N 13/0059 (2013.01); H04N 13/0275 (2013.01)

(56) References Cited

U.S. PATENT DOCUMENTS

| | | | |
|---|---|---|---|
| RE39,342 E | 10/2006 | Starks et al. | |
| 7,991,228 B2 | 8/2011 | Blake et al. | |
| 8,228,327 B2 | 7/2012 | Hendrickson et al. | |
| 8,300,089 B2 | 10/2012 | Robinson | |
| 2003/0156751 A1 | 8/2003 | Lee et al. | |
| 2004/0218784 A1 | 11/2004 | Nichani et al. | |
| 2005/0190180 A1 | 9/2005 | Jin et al. | |
| 2006/0066612 A1 | 3/2006 | Yang et al. | |
| 2007/0165942 A1 | 7/2007 | Jin et al. | |
| 2008/0303893 A1 | 12/2008 | Kim et al. | |
| 2009/0096863 A1 | 4/2009 | Kim et al. | |
| 2009/0141022 A1 | 6/2009 | Kimpe | |
| 2009/0195640 A1 | 8/2009 | Kim et al. | |
| 2010/0039428 A1 | 2/2010 | Kim et al. | |
| 2010/0091093 A1 | 4/2010 | Robinson | |
| 2010/0124371 A1 | 5/2010 | Jiang et al. | |
| 2010/0302234 A1 | 12/2010 | Kao et al. | |
| 2011/0001792 A1 | 1/2011 | Pandit et al. | |
| 2011/0032338 A1 | 2/2011 | Raveendran et al. | |
| 2011/0109720 A1 | 5/2011 | Smolic et al. | |
| 2011/0199465 A1 | 8/2011 | Barenbrug et al. | |
| 2013/0057644 A1 | 3/2013 | Stefanoski et al. | |
| 2015/0062296 A1* | 3/2015 | Bruls ................ | H04N 13/0022 348/43 |

OTHER PUBLICATIONS

Senoh et al., "AHG8: Draft Text for Signaling of Alternative 3D Format in ISO/IEC 14496-10," Joint Collaborative Team on 3D Video Coding Extension Development of ITU-T SG 16 WP 3 and ISO/IEC JTC 1/SC 29/WG 11, Geneva, CH, Jan. 17-23, 2013.*
Senoh, T. et al: "AHG8: Draft Text for Signaling of Alternative 3D Format in ISO/IEC 14496-10 (ITU-T H.264)", 3. JCT-3V Meeting; 103. MPEG Meeting; Jan. 17, 2013- Jan. 23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-00048, Jan. 10, 2013.
Stefanoski, N. et al: "3DV: Results on coding of warps using HEVC", 1. JCT-3V Meeting; 101. MPEG Meeting; Jul. 16, 2012- Jul. 20, 2012; Stockholm; (The Joint Collaborative Team on 3D Video Coding Extension Development of ISO/IEC JTC1/SC29/ WG11 and ITU-T SG.16 ); URL: http://phenix.int-evry.fr/jct21, No. JCT3V-A0004, Jul. 10, 2012.
Stefanoski, N. et al: "AHG8: Draft Text for Signaling Warp Maps as an Alternative 3D Format in 3D-HEVC", 4. JCT-3V Meeting; Apr. 20, 2013-Apr. 26, 2013; INCHEON; (The Joint Collaborative Team on 3D Video Coding Extension Development of ISO/IEC JTC1/SC29/WG11 and ITU-T SG.16 ); URL: http://phenix.int-evry. fr/jct2/, No. JCT3V-D0103, Apr. 13, 2013.
Senoh, T. et al: "AHG8: Draft Text for Signaling Global View and Depth as an Alternative 3D Format in 3D-HEVC", 4. JCT-3V Meeting; Apr. 20, 2013-Apr. 26, 2013; INCHEON; (The Joint Collaborative Team on 3D Video Coding Extension Development of ISO/IEC JTCI/SC29/WGII and ITU-T SG.16 ); URL: http://phenix. intevry.fr/jct2/, No. JCT3V-D0272, Apr. 15, 2013.
Smolic, A. et al: "Image Domain Warping as Alternative to DIBR for Advanced 3DV Applications", 96. MPEG Meeting; Mar. 21, 2011-Mar. 25, 2011; Geneva; (Motion Picture Expert Group or ISO/IEC JTCI/SC29/WG11) No. m19995, Mar. 15, 2011.
European Search Report for EP 14164611.7, Jul. 18, 2014.
Redert et al.: "Visualization of arbitrary-shaped 3D scenes on depth-limited 3D displays", USA, IEEE, Sep. 6, 2004, pp. 938-942 <10.1109/TDPVT.2004.1335416>.
Coles, Warren, Examination Report: Patent Application No: 589170. Intellectual Property Office of New Zealand, Nov. 18, 2010, Wellington, New Zealand, Nov. 18, 2010, Wellington, New Zealand.
Krishnamurthy et al. "Compression and transmission of depth maps for image-based rendering" 2001 International Conference on Image Processing. (Oct. 2001). Proceedings. vol. 3, p. 828-831.
Kadir, Timor et al, Saliency, Scale and Image Description, International Journal of Computer Vision, Nov. 2001, vol. 45, Issue 2, Kluwer Academic Publishers, Hingham, United States.

* cited by examiner

Alternative depth information SEI message syntax

200

| alternative_depth_info (payloadSize) { | Descriptor |
|---|---|
|   depth_type   ~ 206 | u(2) |
|   if( depth_type == 0 ) { | |
|     min_x_offset_int ~ 208 | se(v) |
|     min_x_offset_frac ~ 210 | u(8) |
|     max_x_offset_int ~ 212 | se(v) |
|     max_x_offset_frac ~ 214 | u(8) |
|     y_offset_present_flag ~ 216 | u(1) |
|     if (y_offset_present_flag) { | |
|       min_y_offset_int ~ 218 | se(v) |
|       min_y_offset_frac ~ 220 | u(8) |
|       max_y_offset_int ~ 222 | se(v) |
|       max_y_offset_frac ~ 224 | u(8) |
|     } | |
|     warp_map_size_present_flag ~ 226 | u(1) |
|     if( warp_map_size_present_flag ) { | |
|       warp_map_width ~ 228 | ue(v) |
|       warp_map_height ~ 230 | ue(v) |
|     } | |
|   } | |
| } | | syntax elements 202      204

FIG. 2

```
deltax = pic_width_in_luma_samples / (warp_map_width - 1 )
deltay = pic_height_in_luma_samples / (warp_map_height - 1)
for (x=0;x<warp_map_width;++x)
  for (y=0;y<warp_map_height;++y){
    w[x][y][0] = x * deltax + min_x_offset + (max_x_offset-min_x_offset) /225 * d[x][y]
    if (y_offset_present_flag) {
      w[x][y][1] = y * deltay + min_y_offset
                 + (max_y_offset-min_y_offset) / 255 * d[x][y + pic_height_in_luma_samples/2]
    } else
      w[x][y][1] = y * deltay
}
```

```
deltax = pic_width_in_luma_samples / (warp_map_width - 1)
deltay = pic_height_in_luma_samples / (warp_map_height - 1)
for (x=0;x<warp_map_width;++x)
    for (y=0;y<warp_map_height;++y){
        w_pq [x][y][0] + (M-P)/(Q-P) * (w_pm[x][y][0] - x*deltax) + x * deltax
        w_pq [x][y][1] + (M-P)/(Q-P) * (w_pm[x][y][1] - y*deltay) + y * deltay
    }
}
```
⎫
⎬ 500
⎭

FIG. 5

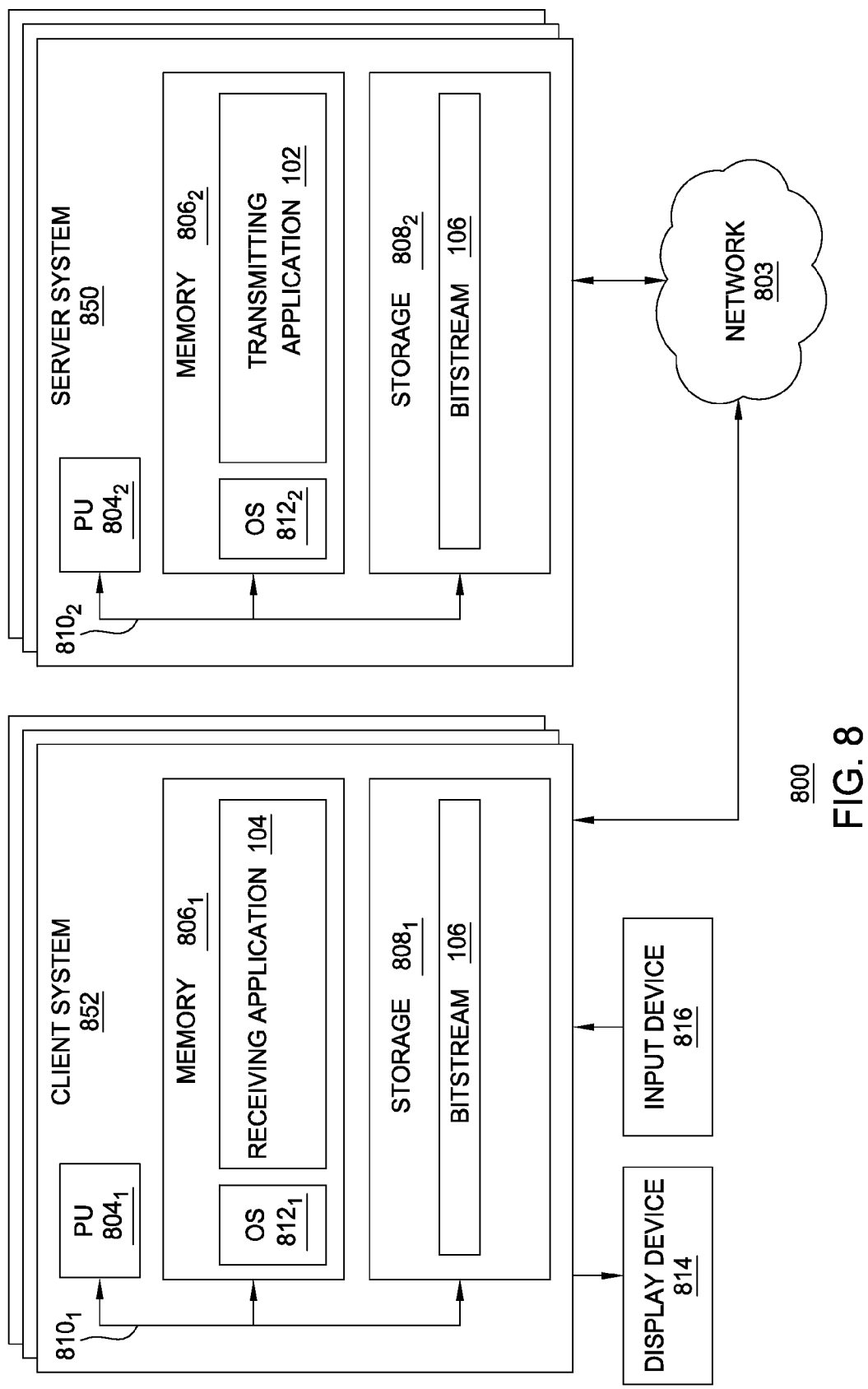

SIGNALING WARP MAPS USING A HIGH EFFICIENCY VIDEO CODING (HEVC) EXTENSION FOR 3D VIDEO CODING

CROSS-REFERENCE TO RELATED APPLICATIONS

This application claims benefit of U.S. provisional patent application Ser. No. 61/811,473, filed on Apr. 12, 2013. Further, this application is related to co-pending U.S. patent application Ser. Nos. 12/766,734 and 13/601,363, respectively. Each of these applications is herein incorporated by reference in its entirety.

BACKGROUND

Field of the Invention

Human beings typically see using stereoscopic vision. The left and right eyes of an observer each perceives slightly different views of a scene, and the brain of the observer fuses the slightly different views into a single image that provides depth information. The depth information allows the observer to perceive the relative distance to various objects in the scene. Movies filmed with a single camera may not provide such depth information to the viewer and thus tend to look flat.

Early efforts in 3-D movie technology used anaglyphs, in which two images of the same scene, with a relative offset between them, are superimposed on a single piece of movie film, with the images being subject to complimentary color filters (e.g., red and green). Viewers donned special glasses so that one image would be seen only by the left eye while the other would be seen only by the right eye. When the brains of the viewers fused the two images, the result was the illusion of depth. In the 1950s, "dual-strip" projection techniques were widely used to show 3-D movies. Using dual-strip projection techniques, two films were projected side-by-side in synchronism, with the light from each projector being oppositely polarized. Viewers wore polarizing glasses, and each eye would see only one of the two images. More recently, active polarization has been used to distinguish left-eye and right-eye images. Left-eye and right-eye images are projected sequentially using an active direction-flipping circular polarizer that applies opposite circular polarization to the left-eye and right-eye frames. The viewer dons glasses with opposite fixed circular polarizers for each eye, so that each eye sees only the intended frames. Various other systems for projecting 3-D movies have also been used over the years.

The trend towards 3-D movies in theatres and in home entertainment systems has been growing. The 3-D movies may be produced using stereoscopic techniques. Stereoscopic techniques create an illusion of depth from a pair of 2-D images, each of which is presented to a separate eye of a viewer. The pair of 2-D images may represent two slightly different perspectives of a scene. The slightly different perspectives may resemble the natural, binocular vision of the eyes of the viewer. By presenting 2-D images of slightly different perspectives to the right eye and to the left eye of the viewer, respectively, the viewer may perceive a three dimensional composite of the 2-D images, in which certain objects of the scene appear nearer to the viewer than other objects of the scene. That is, the brain of the viewer may merge or fuse the left and right eye images to create a perception of depth.

The degree of offset of objects in the image pair determines the depth at which the objects are perceived by the viewer. An object may appear to protrude toward the viewer and away from the neutral plane or screen when the position or coordinates of the left eye image are crossed with the position or coordinates of the right eye image (e.g., negative parallax). In contrast, an object may appear to recede or be behind the screen when the position or coordinates of the left eye image and of the right image are not crossed (e.g., positive parallax).

It is increasingly common for movies to be filmed (in the case of live action movies) or imaged (in the case of rendered animations) in stereo for 3-D viewing. Image frames used to produce stereoscopic video (or stereo video) may be referred to as stereoscopic images. An image frame (or simply, frame) refers to an image at a specific point in time. An illusion of motion may be achieved by presenting multiple frames per second (fps) to the viewer, such as twenty-four to thirty fps. A frame may include content from a live action movie filmed with two or more cameras. A frame may also include content from a rendered animation that is imaged using two camera locations. In stereo video, stereoscopic perception results from the presenting a left eye image stream and a right eye image stream to the viewer.

SUMMARY

Embodiments presented in this disclosure provide a method, computer-readable medium, and system to perform an operation for view generation based on a video coding scheme. The operation includes receiving a first bitstream encoded based on the video coding scheme. The first bitstream includes video, one or more quantized warp map offsets, and a first message of a predefined message type specified by the video coding scheme. The first message contains a plurality of syntax elements including a first syntax element and a second syntax element. The operation also includes interpreting, based on the first syntax element included in the first message, depth samples decoded from the first bitstream, as a first predefined depth format comprising quantized warp map offsets. The operation also includes generating one or more warp maps based on one or more quantized warp map offsets interpreted from the first bitstream, and based further on at least the second syntax element. The operation also includes generating one or more views using image-domain warping and based on the video and one or more warp maps.

Other embodiments presented herein provide a method of view generation based on a video coding scheme. The method includes generating a first bitstream encoded based on the video coding scheme. The first bitstream includes video, one or more quantized warp map offsets, and a first message of a predefined message type specified by the video coding scheme. The first message contains a plurality of syntax elements including a first syntax element and a second syntax element. The method also includes transmitting the first bitstream to a receiving entity. The receiving entity is configured to interpret, based on the first syntax element included in the first message, depth samples decoded from the first bitstream, as a first predefined depth format comprising quantized warp map offsets. The receiving entity is also configured to generate one or more warp maps based on one or more quantized warp map offsets interpreted from the first bitstream, and based further on at least the second syntax element. The receiving entity is also configured to generate one or more views using image-domain warping and based on the video and the one or more warp maps.

BRIEF DESCRIPTION OF THE DRAWINGS

So that the manner in which the above recited features presented in this disclosure can be understood in detail, a more particular description, briefly summarized above, may be had by reference to embodiments, some of which are illustrated in the appended drawings. It is to be noted, however, that the appended drawings illustrate only typical embodiments presented in this disclosure and are therefore not to be considered limiting of its scope, for the disclosure may admit to other equally effective embodiments.

FIG. 2 depicts a syntax for a supplementary enhancement information (SEI) message, according to one embodiment presented in this disclosure.

FIG. 5 depicts pseudocode to derive a warp map used to synthesize a view at an arbitrary position using an input view at a different position, according to one embodiment presented in this disclosure.

FIG. 8 is a block diagram illustrating components of the system for view generation, according to one embodiment presented in this disclosure.

DETAILED DESCRIPTION

Figure 1:
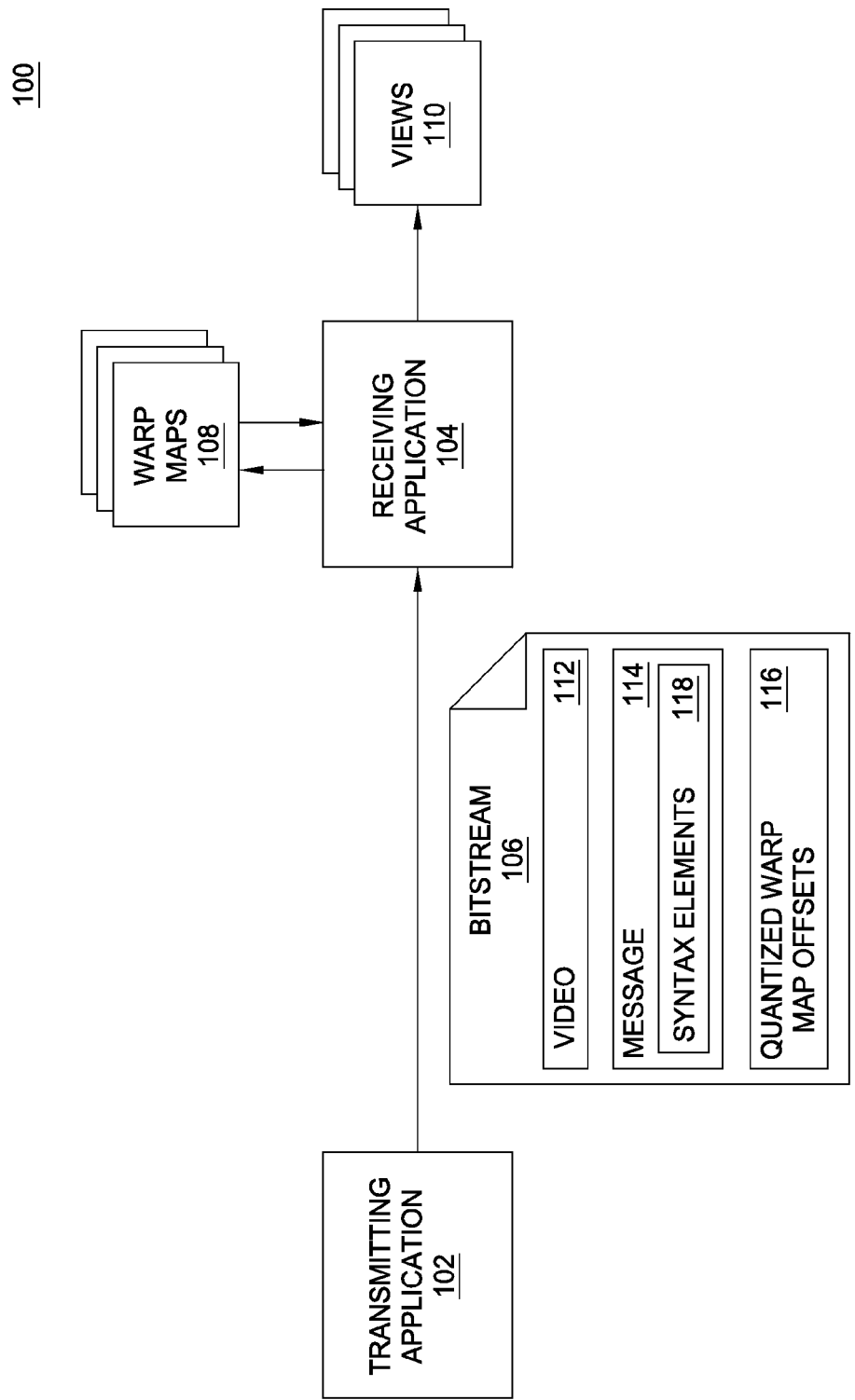
FIG. 1 is a data flow diagram illustrating a system for view generation based on a video coding scheme, according to one embodiment presented in this disclosure.

Embodiments presented in this disclosure provide techniques for view generation based on a video coding scheme. In some embodiments, views may be generated based on warp maps. It may often be desirable to generate multiple views, such as to support use of multiscopic displays, which facilitate stereoscopic viewing without the need for any spectacles to be worn by the user. In scenarios where warp maps are generated during content production, it may be desirable to transmit the warp maps—along with video data—to the users, in order to facilitate generating multiple views by the receiving application. The warp maps may be transmitted based on the video coding scheme and according to embodiments disclosed herein.

In one embodiment, the video coding scheme may be tailored to facilitate transmission of a bitstream containing multi-view video and depth map data. In one embodiment, quantized warp map offsets are transmitted in the bitstream, where the quantized warp map offsets may have the same format as depth maps. Quantized warp map offsets may also be referred to herein as quantized map offsets. So that the receiving application can appropriately interpret the received bitstream, a predefined message is submitted in the bitstream. In one embodiment, the video coding scheme is a High Efficiency Video Coding (HEVC) extension for 3D video coding (3D-HEVC), and the predefined message is a supplementary enhancement information (SEI) message.

In one embodiment, the message indicates, to the receiving application, that image-domain warping—rather than depth-image-based rendering—is to be used as a view synthesis technique. Additionally or alternatively, the message indicates, to the receiving application, that depth samples decoded from the bitstream are to be interpreted as quantized warp map offsets as opposed to depth samples such as a depth map. The message may also indicate, to the receiving application, that syntax elements included in the message are to be used to generate warp maps based on the quantized warp map offsets. The message may also indicate, to the receiving application, that the generated warp maps are to be used for view generation based on image-domain warping. Further, the message need not necessarily be transmitted in some cases, such as where it is desired to transmit multi-view video and depth map data based on the video coding scheme. In such cases, the receiving application uses depth-image-based rendering in lieu of image-domain warping, to generate views. The syntax and semantics associated with the message are specified in the present disclosure, including Appendices A-B attached hereto.

At least in some embodiments, warp maps may often be generated more efficiently or conveniently than depth maps. For instance, warp map generation may often not require as much human intervention as depth map generation. In some embodiments, warp map generation may be substantially or even fully automatic. By using the techniques disclosed herein to generate views based on warp maps, the views may also be generated more efficiently or conveniently at least in some cases.

FIG. 1 is a data flow diagram illustrating a system 100 for view generation based on a video coding scheme, according to one embodiment presented in this disclosure. As shown, the system 100 includes a transmitting application 102 and a receiving application 104. In one embodiment, the transmitting application 102 generates a bitstream 106 encoded based on the video coding scheme. The bitstream 106 includes video 112, quantized warp map offsets 116, and a message 114 of a message type specified by the video coding scheme. The message 114 contains syntax elements 118. The transmitting application 102 transmits the bitstream 106 to the receiving application 104. The receiving application 104 receives the bitstream 106 and interprets, based on a first syntax element 118 included in the message 114, depth samples decoded from the bitstream 106, as a first depth format of quantized warp map offsets. The receiving application 104 then generates warp maps 108 based on quantized warp map offsets interpreted from the bitstream 106 and based further on a second syntax element 118 included in the message 114. The receiving application 104 then generates views 110 using image-domain warping and based on the video 112 and the warp maps 108.

In one embodiment, the video coding scheme is 3D-HEVC, and the message type is the SEI message type. The video 112 may be multi-view video. Further, image-domain warping may be used in lieu of depth-image-based rendering, and the depth samples may be interpreted as quantized warp map offsets in lieu of depth maps. In some embodiments, multi-view video and depth map data are transmitted using 3D-HEVC and in lieu of an SEI message. The first syntax element may specify any of a plurality of predefined depth types, such as quantized warp map offsets, depth maps, and so forth.

FIG. 2 depicts a syntax 200 for an SEI message, according to one embodiment presented in this disclosure. The syntax 200 specifies syntax elements 202 in the SEI message and descriptors 204, each indicating a predefined parsing process for respective syntax element. In one embodiment, the SEI message signals to interpret decoded depth samples as an alternative depth format. A first syntax element 206 in the SEI message specifies a desired, alternative depth type. In one embodiment, a depth type value of zero indicates to use decoded depth samples to derive a warp map and further indicates to perform view synthesis via image-domain warping, while other depth type values, e.g., one through three, are reserved values. In one embodiment, a predefined depth type value, other than zero, indicates to perform view synthesis based on depth-image-based rendering rather than based on image-domain warping.

In one embodiment, additional syntax elements contained in the SEI message are used to derive corresponding warp maps from decoded depth samples of each view. For instance, a second syntax element 208 in the SEI message specifies an integer part of a minimum offset for a horizontal direction of a warp map. A third syntax element 210 specifies a fractional part of the minimum offset for the horizontal direction of the warp map. These syntax elements 208, 210 may be used to derive a minimum horizontal offset, as follows:

$$\min\_x\_\text{offset} = \min\_x\_\text{offset}\_int + \min\_x\_\text{offset}\_frac/256 \quad \text{(Equation 1)}.$$

Similarly, a fourth syntax element 212 specifies an integer part of a maximum offset for the horizontal direction of the warp map. A fifth syntax element 214 specifies a fractional part of the maximum offset for the horizontal direction of the warp map. The syntax elements 212, 214 may be used to derive a maximum horizontal offset, as follows:

$$\max\_x\_\text{offset} = \max\_x\_\text{offset}\_int + \max\_x\_\text{offset}\_frac/256 \quad \text{(Equation 2)}.$$

In one embodiment, a sixth syntax element 216 in the SEI message is a flag that, when set, indicates the presence of minimum and maximum offset values for the vertical direction. A seventh syntax element 218 specifies an integer part of a minimum offset for a vertical direction of the warp map. An eighth syntax element 220 species a fractional part of the minimum offset for the vertical direction of the warp map. The syntax elements 218, 220 may be used to derive a minimum vertical offset, as follows:

```
if ( y_offset_present_flag )                              (Equation 3)
    min_y_offset = min_x_offset_int + min_x_offset_frac/256
else
    min_y_offset = 0.
```

Similarly, a ninth syntax element 222 specifies an integer part of a maximum offset for the vertical direction of the warp map. A tenth syntax element 224 specifies a fractional part of the maximum offset for the vertical direction of the warp map. The syntax elements 222, 224 may be used to derive a maximum vertical offset, as follows:

```
if ( y_offset_present_flag )                              (Equation 4)
    max_y_offset = max_x_offset_int + max_x_offset_frac/256
else
    max_y_offset = 0.
```

In one embodiment, an eleventh syntax element 226 in the SEI message is a flag that, when set, specifies the presence of a new warp map size that is valid for the current and all ensuing warp maps in output order, until another new warp map size is explicitly specified. When cleared, the flag specifies that the warp map size remains unchanged. Twelfth and thirteenth syntax elements 228 and 230 specify a width and a height of the warp map, respectively. In one embodiment, valid values for the syntax elements 228, 230 are given as follows:

```
0 <= warp_map_width <= pic_width_in_luma_samples        (Expression 1)
if ( ! y_offset_present_flag )
    0 <= warp_map_height <= pic_height_in_luma_samples
else
    0 <= warp_map_height <= pic_height_in_luma_samples / 2.
```

Although embodiments herein are described with reference to the syntax 200 and the syntax elements 202, this is not intended to be limiting of disclosed embodiments, and other syntaxes, syntax elements, descriptors, and values are broadly contemplated in the present disclosure.

Figures 3, 4:
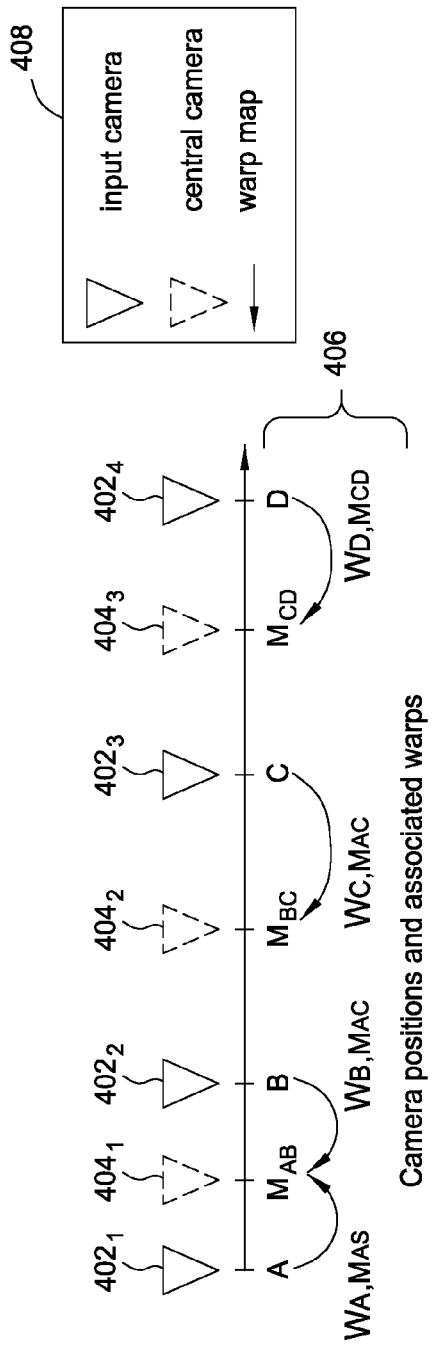
FIG. 3 depicts pseudocode to derive a warp map from decoded depth samples and syntax elements provided by the SEI message, according to one embodiment presented in this disclosure.
FIG. 4 illustrates exemplary camera positions and associated warp maps, according to one embodiment presented in this disclosure.

FIG. 3 depicts pseudocode 300 to derive a warp map from decoded depth samples and syntax elements provided by the SEI message, according to one embodiment presented in this disclosure. As shown, the pseudocode 300 iterates though the width and height of the warp map, respectively, deriving each value of the warp map based on the decoded depth samples and syntax elements. In such a manner, decoded depth samples of each view are used to derive a corresponding warp map for the respective view. The decoded depth samples and the warp map are represented in the pseudocode 300 as d and w, respectively. In one embodiment, each warp map so derived is assigned to its corresponding input view. Further, each warp map has a property to map the corresponding input view to a central camera position.

FIG. 4 illustrates exemplary camera positions and associated warp maps 406, according to one embodiment presented in this disclosure. As indicated by a legend 408, the camera positions include input camera positions 402 and central camera positions 404. In this particular example, only the warp map $W_{A,M\_AB}$ of the leftmost input view maps its corresponding input view to a central camera position $404_1$ to its right. In contrast, the other warps maps $W_{B,M\_AB}$, $W_{C,M\_BC}$, $W_{D,M\_CD}$ map their corresponding input views to central camera positions $404_1$, $404_2$, $404_3$ to their left, respectively.

FIG. 5 depicts pseudocode 500 to derive a warp map used to synthesize a view at an arbitrary position Q using an input view at position P, according to one embodiment presented in this disclosure. Position P corresponds to either positions A, B, C, or D in FIG. 4. The warp map, represented in the pseudocode 500 as w_pq, is derived from a warp map w_pm, which maps the same input view to a central camera position M in FIG. 4. The warp map w_pq is then used to synthesize the texture for a view at position Q from texture of a view at position P.

In one embodiment, warp map samples are interpreted as a two-dimensional sub-pixel position in the synthesized view, to which the color samples of the input view at the sub-pixel position (x*deltax, y*deltax) are mapped. The warp map samples are represented in the pseudocode as w_pq[x][y][0] and w_pq[x][y][1]. A warp map also represents a mapping of color samples of quads of the input view to corresponding quads in the synthesized view. In one embodiment, the quads of the input view are defined by four positions given by:

$$(x*deltax, y*deltay), ((x+1)*deltax, y*deltay), ((x+1)*deltax, (y+1)*deltay), \text{ and } (x*deltax, (y+1)*deltay). \quad \text{(Expression 2)}$$

The corresponding quads in the synthesized view are defined by corresponding positions given by:

$$(w\_pq[x][y][0], w\_pq[x][y][1]), (w\_pq[x+1][y][0], w\_pq[x+1][y][1]), (w\_pq[x+1][y+1][0], w\_pq[x+1][y+1][1]), \text{ and } (w\_pq[x][y+1][0], w\_pq[x][y+1][1]). \quad \text{(Expression 3)}$$

Thus, the quad-based color mapping process described above provides synthesis of an arbitrary view at position Q from an input view at position P and a warp map w_pq, where the warp map w_pq is derived from a warp map w_pm, which is in turn derived from decoded depth samples and syntax elements provided by the SEI message. Depending on the embodiment, the position of a view to synthesize may not necessarily be disposed between two input views. In cases where the view is indeed disposed between two input views, then two different versions of the view may be synthesized, including a first version based on the closest input view to its left, and a second version based on the closest input view to its right. A final synthesized view may then be computed by combining both results via a predefined view composition technique, e.g., pixel-wise blending. On the other hand, in cases where the view to synthesize is not disposed between input views, then the closest input view may be used to synthesize the view.

Figure 6:
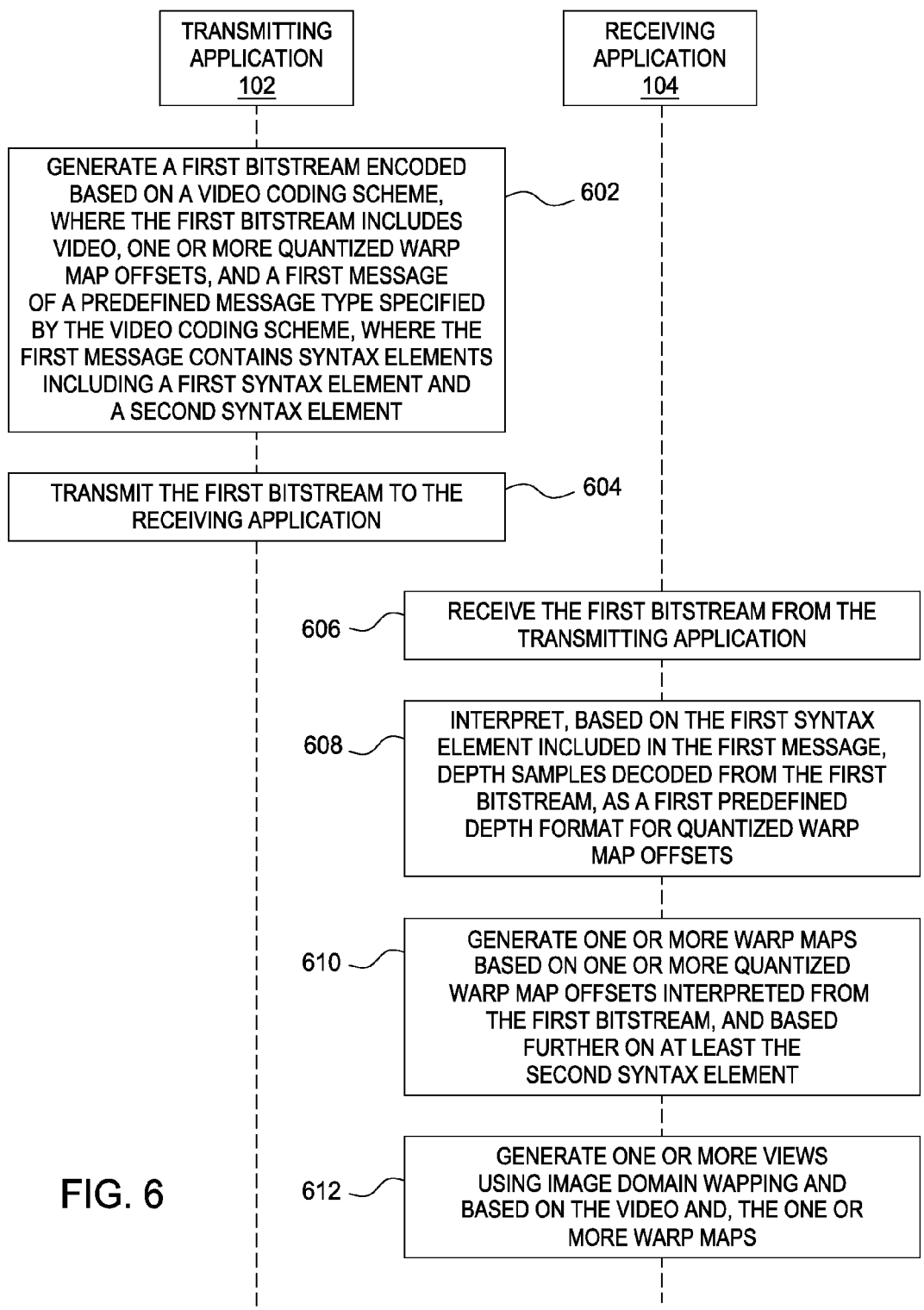
FIG. 6 is a flowchart depicting a method for view generation based on the video coding scheme, according to one embodiment presented in this disclosure.

FIG. 6 is a flowchart depicting a method 600 for view generation based on the video coding scheme, according to one embodiment presented in this disclosure. As shown, the method 600 begins at step 602, where the transmitting application 102 generates a first bitstream encoded based on the video coding scheme. The first bitstream includes video, one or more quantized warp map offsets, and a first message of a predefined message type specified by the video coding scheme. The first message contains syntax elements including a first syntax element and a second syntax element. Each syntax element is disposed at an arbitrarily defined offset within the first message. In other words, reference to the first syntax element does not necessarily imply that the first syntax element is first in order relative to other syntax elements in the first message. Depending on the embodiment, the first syntax element may be first in order, second in order, last in order, etc. At step 604, the transmitting application 102 transmits the first bitstream to the receiving application 104.

At step 606, the receiving application 104 receives the first bitstream from the transmitting application. At step 608, the receiving application 104 interprets, based on the first syntax element included in the first message, depth samples decoded from the first bitstream, as a first predefined depth format of quantized warp map offsets. At step 610, the receiving application 104 generates one or more warp maps based on one or more quantized warp map offsets interpreted from the first bitstream, and based further on at least the second syntax element. At step 612, the receiving application 104 generates one or more views using image-domain warping and based on the video and the one or more warp maps.

Figure 7:
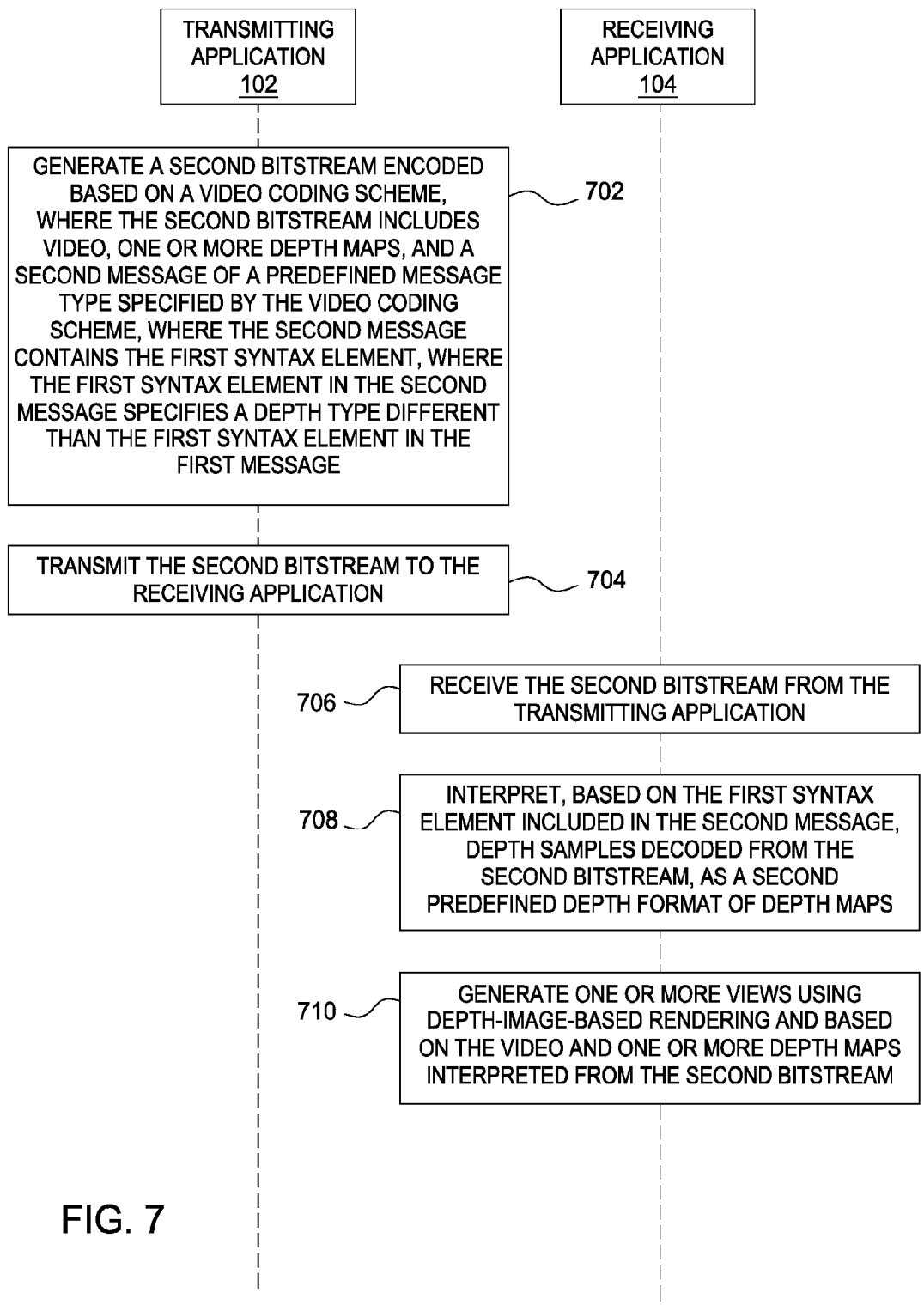
FIG. 7 is a flowchart depicting a method for view generation based on the video coding scheme, according to one embodiment presented in this disclosure.

FIG. 7 is a flowchart depicting a method 700 for view generation based on the video coding scheme, according to one embodiment presented in this disclosure. As shown, the method 700 begins at step 702, where the transmitting application generates a second bitstream encoded based on the video coding scheme. The second bitstream includes video, one or more depth maps, and a second message of the predefined message type specified by the video coding scheme. Depending on the embodiment, the video included in the second bitstream may be the same as or different from the video included in the first bitstream. The second message contains the first syntax element. The first syntax element in the second message specifies a depth type different than the first syntax element in the first message. At step 704, the transmitting application 102 transmits the second bitstream to the receiving application 104.

At step 706, the receiving application 104 receives the second bitstream from the transmitting application 102. At step 708, the receiving application 104 interprets, based on the first syntax element included in the second message, depth samples decoded from the second bitstream, as a second predefined format of depth maps. At step 710, the receiving application 104 generates one or more views using depth-image-based rendering and based on the video and one or more depth maps interpreted from the second bitstream.

FIG. 8 is a block diagram illustrating components of the system 800 for view generation, according to one embodiment presented in this disclosure. The system 800 corresponds to the system 100 of FIG. 1. As shown, the system 800 includes a plurality of client systems 852 and a plurality of server systems 850. The client systems 852 are communicatively coupled via a network 803. In some embodiments, the server systems 850 may also be communicatively coupled via the network 803 or via a network other than the network 803. In one embodiment, the network 803 is an ad hoc network connecting multiple cellular phones.

In one embodiment, the client systems 852 may include existing computer systems, e.g., smartphones and other cellular phones, desktop computers, server computers, laptop computers, tablet computers, gaming consoles, handheld or portable devices and the like. The client systems 852 illustrated in FIG. 8, however, are merely examples of computer systems in which embodiments disclosed herein may be used. Embodiments disclosed herein may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments disclosed herein may be implemented using any device or computer system capable of performing the functions described herein.

As shown, each client system 852 and server system 850 includes, without limitation, a processor 804, which obtains instructions and data via a bus 810 from a memory 806 and storage 808. The processor 804 is a programmable logic device that performs instruction, logic, and mathematical processing, and may be representative of one or more CPUs. The memory 806 is any memory sufficiently large to hold the necessary programs and data structures. The memory 806 could be one or a combination of memory devices, including Random Access Memory, nonvolatile or backup memory (e.g., programmable or Flash memories, read-only memories, etc.).

As shown, the memory 806 includes an operating system ("OS") 812. Operating system 812 is software used for managing the operation of the client system 852 or the server system 850. Examples of the OS 812 include UNIX, versions of the Microsoft Windows® operating system and distributions of the Linux® operating system. Additional examples of the OS 812 include custom operating systems for smartphones and gaming consoles, including the custom operating systems for systems such as the Microsoft Xbox 360®, Nintendo WHO and Sony PlayStation® 3. As shown, the memory $806_1$ of the client system 852 further includes the receiving application 104, which is configured according to embodiments described above. The memory $806_2$ of the server system 850 further includes the transmitting application 102, which is also configured according to embodiments described above.

In one embodiment, the storage 808 is representative of hard-disk drives, flash memory devices, optical media and the like. Generally, the storage 808 stores application programs and data for use by the client systems 852. In addition, the memory 806 and the storage 808 may be considered to include memory physically located elsewhere; for example, on another computer coupled to the client system 852 or to the server system 850 via the bus 810. The client systems 852 and the server systems 850 include network interfaces for operably connecting to one another via a network, such as the network 803. As shown, the storage $808_2$ of the server system 850 includes the bitstream 106 to be transmitted to the client system 852. The storage $808_1$ of the client system 852 includes the bitstream 106 that is received from the server system 850, according to embodiments described above.

In one embodiment, the client systems 852 are each coupled to a display device 814. The display device 814 may include output devices such as cellular phone displays, movie theater displays, monitors, touch screen displays, and so forth. In some embodiments, each client system 852 is also coupled to an input device 816. The input device 816 may include keypads, keyboards, mice, controllers, and so forth.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, the bitstream 106 may be stored in the cloud, and the transmitting application 102 or the receiving application 104 may additionally execute in the cloud, thereby improving accessibility of the bitstream 106 at least in some cases.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments. That is, although specific embodiments and numerous specific details are set forth to provide a more thorough understanding of the present disclosure, persons skilled in the art, however, will understand that various modifications and changes may be made thereto without departing from the broader spirit and scope of the disclosure. The foregoing description and drawings are, accordingly, to be regarded in an illustrative rather than a restrictive sense.

What is claimed is:

1. A computer-implemented method of view generation based on a video coding scheme, the computer-implemented method comprising:
   receiving a first bitstream encoded based on the video coding scheme, the first bitstream including video and a first message of a predefined message type specified by the video coding scheme, the first message containing a plurality of syntax elements; and
   upon determining that the plurality of syntax elements includes an image-domain-warping designator that causes image-domain warping based on decoded warp map offsets in lieu of a depth-image-based-rendering designator that causes depth-image-based rendering based on decoded depth maps:
      decoding one or more warp map offsets from the first bitstream and by operation of one or more computer processors;
      generating one or more warp maps based on: (i) the one or more warp map offsets decoded from the first bitstream and (ii) one or more warp map attributes included in the plurality of syntax elements; and
      generating one or more views using image-domain warping and based on: (i) the video and (ii) the one or more warp maps.

2. The computer-implemented method of claim 1, wherein the video coding scheme comprises a High Efficiency Video Coding extension for 3D video coding (3D-HEVC).

3. The computer-implemented method of claim 2, wherein the predefined message type comprises a supplementary enhancement information (SEI) message type, wherein the image-domain-warping designator is disposed at an arbitrary offset within the first message.

4. The computer-implemented method of claim 1, wherein for the predefined message type specified by the video coding scheme, the depth-image-based-rendering designator is specifiable in lieu of the image-domain-warping designator, wherein the one or more views generated using image-domain warping are not generated based on any depth map, wherein the one or more warp maps are generated according to a predefined algorithm that iterates through a width and a height of the warp map in order to derive each value of the warp map based on the one or more warp map offsets and the one or more warp map attributes.

5. The computer-implemented method of claim 4, wherein each of the one or more warp maps represents a mapping of color samples: (i) from input quads of a respective input view from the video (ii) to corresponding output quads in a respective one of the generated one or more views; wherein each input quad is defined by four sub-pixel positions as given by a first set of predefined sub-pixel expressions, wherein each output quad is defined by four sub-pixel positions as given by a second set of predefined sub-pixel expressions;

wherein a first of the one or more views is of a camera position disposed between respective camera positions of two input views from the video, wherein the first view is generated via pixel blending of two intermediate views respectively derived from the two input views, wherein the one or more views are generated by an application.

6. The computer-implemented method of claim 5 wherein the video coding scheme comprises a High Efficiency Video Coding extension for 3D video coding (3D-HEVC), wherein the predefined message type comprises a supplementary enhancement information (SEI) message type, wherein the first message comprises an SEI message, wherein the video comprises multiview autostereoscopic video, wherein the video and associated depth samples are transmittable: (i) via the SEI message and (ii) via 3D-HEVC in lieu of any SEI message; wherein the application is configured to:
  receive a second bitstream encoded based on the video coding scheme, the second bitstream including video and a second message of the predefined message type specified by the video coding scheme, the second message containing at least one syntax element; and
  upon determining that the at least one syntax element includes an image-domain-warping designator in lieu of a depth-image-based-rendering designator:
    decoding one or more depth maps from the second bitstream; and
    generate one or more views using depth-image-based rendering and based on: (i) the video and (ii) the one or more depth maps.

7. The computer-implemented method of claim 6, wherein the one or more views generated using depth-image-based rendering are not generated based on any warp maps; wherein the warp map offsets are quantized, wherein the one or more warp map attributes include:
  (i) an integer part of a minimum offset for a horizontal direction of warp map;
  (ii) a fractional part of the minimum offset for the horizontal direction of the warp map;
  (iii) an integer part of a maximum offset for the horizontal direction of the warp map;
  (iv) a fractional part of the maximum offset for the horizontal direction of the warp map; and
  (v) a first flag via which presence of minimum and maximum offset values for a vertical direction of the warp map is specifiable.

8. The computer-implemented method of claim 7, wherein the one or more warp map attributes further include:
  (vi) an integer part of a minimum offset of the vertical direction of the warp map;
  (vii) a fractional part of the minimum offset for the vertical direction of the warp map;
  (viii) an integer part of a maximum offset of the vertical direction of the warp map;
  (ix) a fractional part of the maximum offset of the vertical direction of the warp map; and
  (x) a second flag via which validity of a warp map size valid for ensuing warp maps is specifiable;
  wherein the image-domain-warping designator and the depth-image-based-rendering designator comprise distinct values of a single syntax element, wherein the single syntax element is disposed at an arbitrary offset within the first message;
  wherein a stereoscopic property of a video frame of the video is modified, the video frame comprising at least two stereo images and having a stereoscopic property characterizing a stereoscopic relationship between the at least two stereo images, wherein the stereoscopic property of the video frame is modified by altering at least a first of the stereo images of the video frame using at least one predefined disparity mapping operator, wherein the first stereo image has a first set of pixels and a second set of pixels.

9. The computer-implemented method of claim 8, wherein the first set of pixels is warped to a greater extent than the second set of pixels, when the stereoscopically unmodified first stereo image is mapped to the stereoscopically modified first stereo image by a warp map comprising a non-linear warp function, thereby modifying the stereoscopic property of the video frame, wherein the disparity mapping operator is selected from at least a linear operator, a non-linear operator, a gradient domain operator, and a temporal operator, wherein the warp map is selected from the one or more warp maps;
  wherein the linear operator is configured to perform global linear adaptation of a disparity in the at least one video frame to a target range, wherein the non-linear operator is configured to perform non-linear disparity compression in the at least one video frame, wherein the gradient domain operator is configured to remap disparity gradients of the at least one video frame, and wherein the temporal operator is configured to perform temporal smoothing at a scene transition of the at least one video frame.

10. The computer-implemented method of claim 9, wherein the operation is to modify the stereoscopic property of the video frame, based on the non-linear warp function, wherein the first and second sets of pixels are distinct sets of pixels, wherein the stereoscopic property is selected from at least one of an interocular distance of the video frame and a local depth composition of a scene element depicted in the video frame, wherein altering at least a first stereo image of the video frame comprises, without requiring user intervention:
  determining a set of disparities of the video frame;
  computing the at least one mapping function based on the set of disparities of the video frame; and
  applying the computed at least one mapping function to the first stereo image of the video frame.

11. The computer-implemented method of claim 10, wherein the visual characteristic of the video frame specifies one or more salient portions of the video frame, wherein the video frame is stereoscopically modified by an image processing application, wherein the image processing application is configured to independently determine each individual visual characteristic selected from: (i) imaged-based saliency of the at least one video frame; and (ii) disparity-based saliency of the at least one video frame;
  wherein the provided at least one video frame is generated from at least one monoscopic video frame, wherein the video frame is stereoscopically modified based on at least one predefined aspect of disparity, wherein the image processing application is configured to independently modify the video frame based on each individual aspect of disparity selected from: (i) a disparity range of the video frame; (ii) a disparity sensitivity of the video frame; (iii) a disparity gradient of the video frame; and (iv) a disparity velocity of the video frame.

12. The computer-implemented method of claim 11, wherein the disparity range defines a stereoscopic comfort zone for viewing the at least one video frame;
  wherein the disparity sensitivity specifies a level of ease with which different depths are distinguished in the at least one video frame;

wherein the disparity gradient is determined from a disparity of a feature depicted in the at least one video frame and an angular separation of the feature;

wherein the at least one video frame comprises a plurality of video frames, wherein the disparity velocity specifies an extent to which a disparity changes over time in the plurality of video frames;

wherein at least one predefined aspect of disparity is associated with a corresponding predefined disparity mapping operator that is implemented using the at least one mapping function, wherein the video frame is stereoscopically modified using at least one predefined disparity mapping operator;

wherein the image processing application is configured to independently modify the video frame using each individual disparity mapping operator selected from:

(i) a linear operator configured to perform global linear adaptation of a disparity in the at least one video frame to a target range;

(ii) a non-linear operator configured to perform non-linear disparity compression in the at least one video frame;

(iii) a gradient domain operator configured to remap disparity gradients of the at least one video frame; and (iv) a temporal operator configured to perform temporal smoothing at a scene transition of the at least one video frame.

13. The computer-implemented method of claim 12, wherein the non-linear disparity compression is performed via a non-linear function on a sum of: (i) a product of: (A) a disparity value of the at least one video frame and (B) a predefined scaling factor; and (ii) a predefined constant; wherein the non-linear function comprises a logarithm;

wherein a plurality of non-linear functions, including the non-linear function, is used to perform the non-linear disparity compression, each of the plurality of non-linear functions configured to map a respective set of disparity values of the at least one video frame and falling within a respective source disparity range, to a respective target disparity range;

wherein each of the plurality of non-linear functions is distinct, wherein each set of disparity values of the at least one video frame is distinct, wherein each corresponding target disparity range is distinct;

wherein the non-linear operator comprises a predefined function including an integral, over a specified interval, over a set of saliency values corresponding to first derivates of the plurality of non-linear functions, wherein the image processing application is configured to independently perform each individual operation selected from: (i) generating the set of saliency values based on user input and (ii) generating the set of saliency values based on the at least one video frame and without requiring any user input.

14. A non-transitory computer-readable medium containing a program, which when executed is configured to perform an operation for view generation based on a video coding scheme, the operation comprising:

receiving a first bitstream encoded based on the video coding scheme, the first bitstream including video and a first message of a predefined message type specified by the video coding scheme, the first message containing a plurality of syntax elements; and upon determining that the plurality of syntax elements includes an image-domain-warping designator that causes image-domain warping based on decoded warp map offsets in lieu of a depth-image-based-rendering designator that causes depth-image-based rendering based on decoded depth maps:

decoding one or more warp map offsets from the first bitstream and by operation of one or more computer processors when executing the program;

generating one or more warp maps based on: (i) the one or more warp map offsets decoded from the first bitstream and (ii) one or more warp map attributes included in the plurality of syntax elements; and generating one or more views using image-domain warping and based on: (i) the video and (ii) the one or more warp maps.

15. The non-transitory computer-readable medium of claim 14, wherein the video coding scheme comprises a High Efficiency Video Coding extension for 3D video coding (3D-HEVC).

16. The non-transitory computer-readable medium of claim 15, wherein the predefined message type comprises a supplementary enhancement information (SEI) message type, wherein the image-domain-warping designator is disposed at an arbitrary offset within the first message.

17. A system for view generation based on a video coding scheme, the system comprising:

one or more computer processors; and a memory containing a program, which when executed by the one or more computer processors is configured to perform an operation comprising:

receiving a first bitstream encoded based on the video coding scheme, the first bitstream including video and a first message of a predefined message type specified by the video coding scheme, the first message containing a plurality of syntax elements; and upon determining that the plurality of syntax elements includes an image-domain-warping designator that causes image-domain warping based on decoded warp map offsets in lieu of a depth-image-based-rendering designator that causes depth-image-based rendering based on decoded depth maps:

decoding one or more warp map offsets from the first bitstream;

generating one or more warp maps based on: (i) the one or more warp map offsets decoded from the first bitstream and (ii) one or more warp map attributes included in the plurality of syntax elements; and generating one or more views using image-domain warping and based on: (i) the video and (ii) the one or more warp maps.

18. The system of claim 17, wherein the video coding scheme comprises a High Efficiency Video Coding extension for 3D video coding (3D-HEVC).

19. The system of claim 18, wherein the predefined message type comprises a supplementary enhancement information (SEI) message type, wherein the image-domain-warping designator is disposed at an arbitrary offset within the first message.

20. A computer-implemented method of view generation based on a video coding scheme, the computer-implemented method comprising:

generating, by operation of one or more computer processors, a first bitstream encoded based on the video coding scheme, the first bitstream including video and a first message of a predefined message type specified by the video coding scheme, the first message containing a plurality of syntax elements; and transmitting the first bitstream to a receiving entity configured to, upon determining that the plurality of syntax elements includes an image-domain-warping designator that causes image-domain warping based on decoded warp map offsets in lieu of a depth-image-based-rendering designator that causes depth-image-based rendering based on decoded depth maps:
decode one or more warp map offsets from the first bitstream;
generate one or more warp maps based on: (i) the one or more warp map offsets decoded from the first bitstream and (ii) one or more warp map attributes included in the plurality of syntax elements; and
generate one or more views using image-domain warping and based on: (i) the video and (ii) the one or more warp maps.

\* \* \* \* \*